Feb. 14, 1950 — T. E. MONROE — 2,497,230
STITCH AND METHOD OF STITCHING
Filed Feb. 2, 1943 — 6 Sheets-Sheet 2
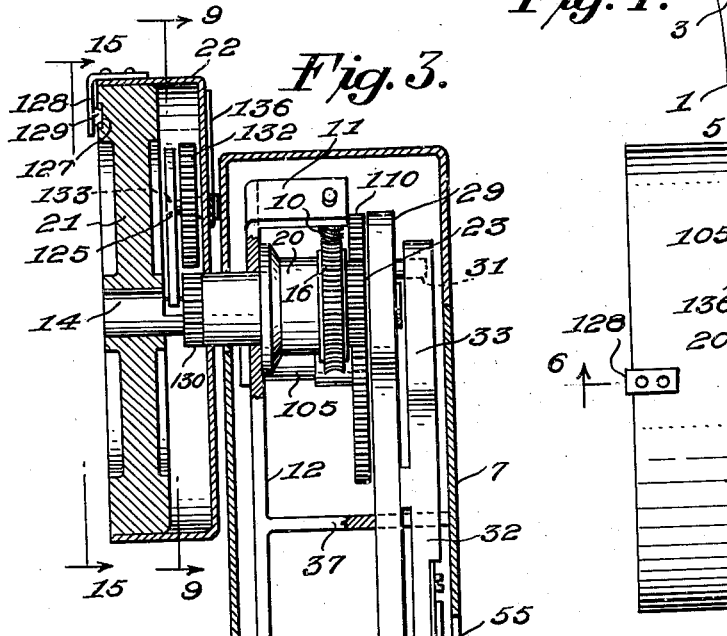
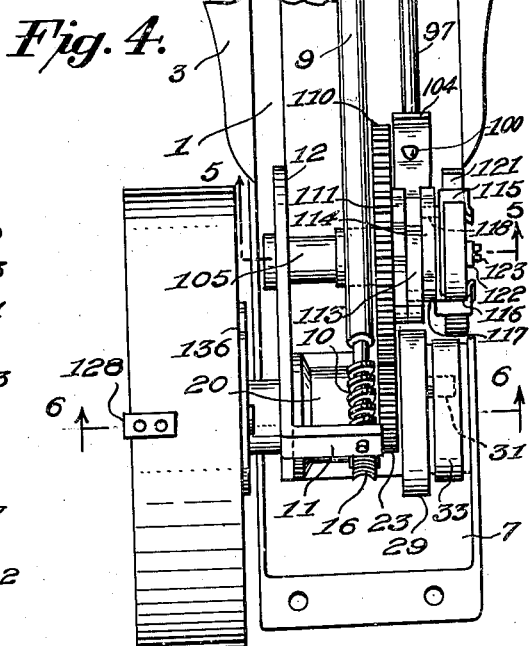
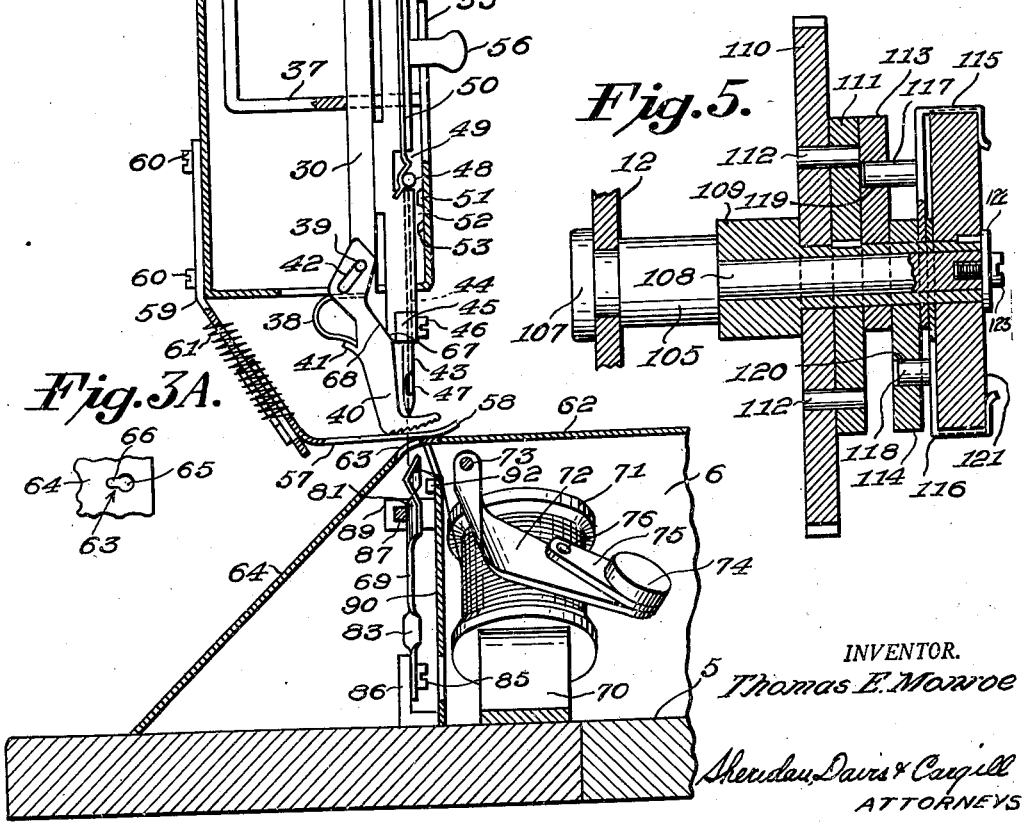
INVENTOR.
Thomas E. Monroe
Sheridan, Davis & Cargill
ATTORNEYS Feb. 14, 1950 T. E. MONROE 2,497,230
STITCH AND METHOD OF STITCHING
Filed Feb. 2, 1943 6 Sheets-Sheet 3
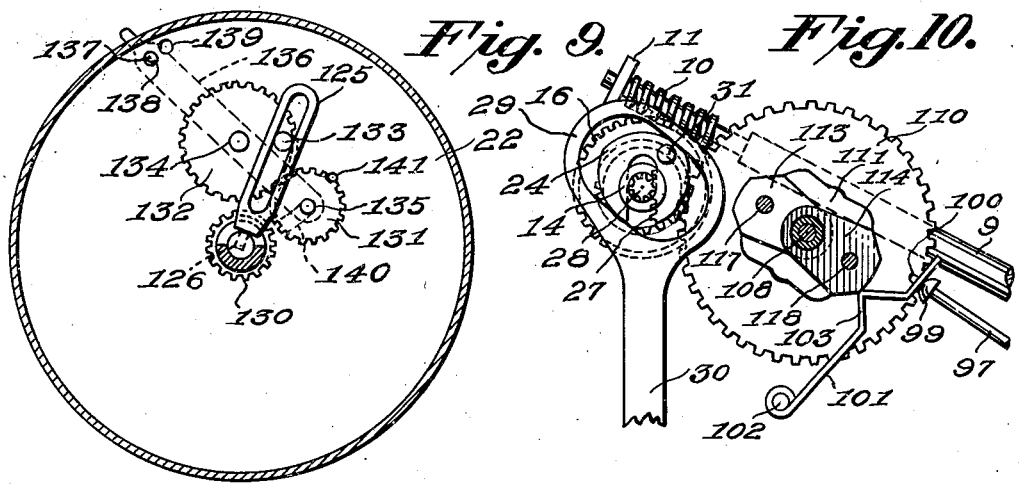
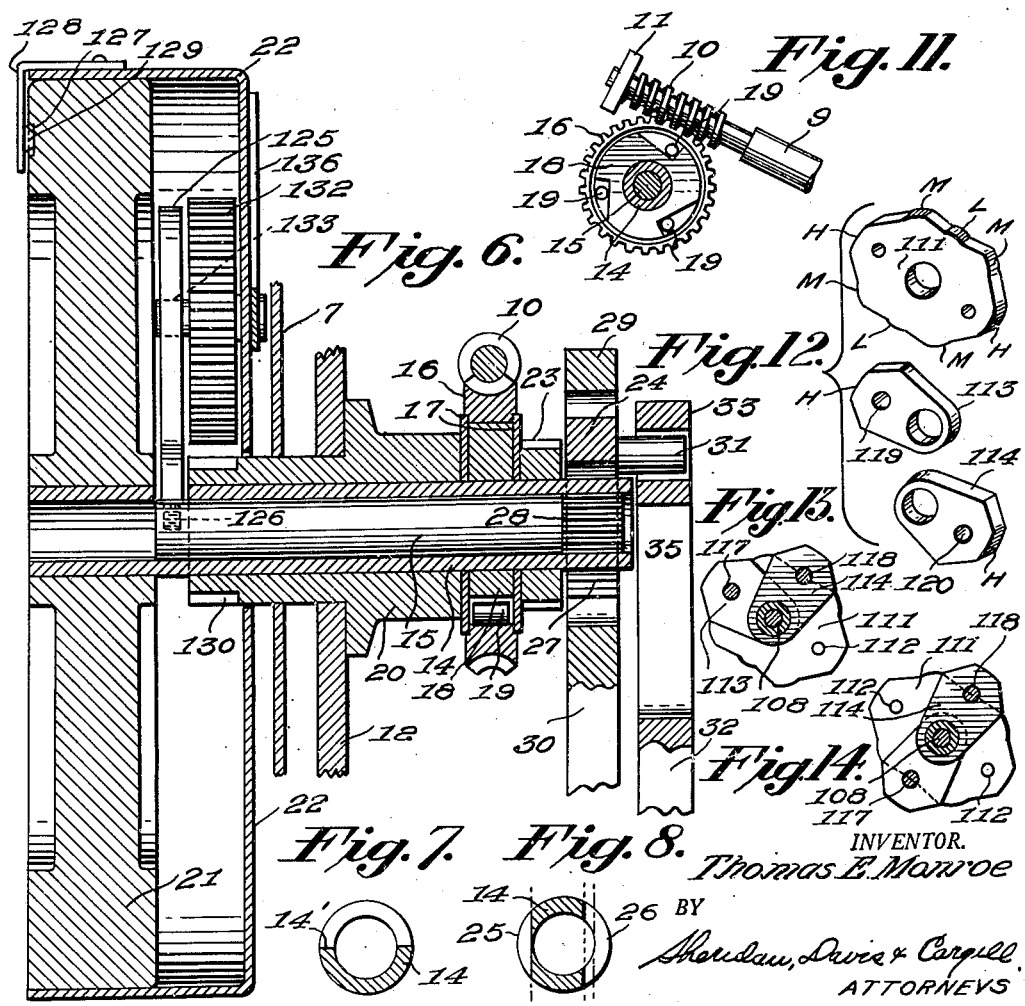
INVENTOR.
Thomas E. Monroe
BY
Sheridan, Davis & Cargill
ATTORNEYS

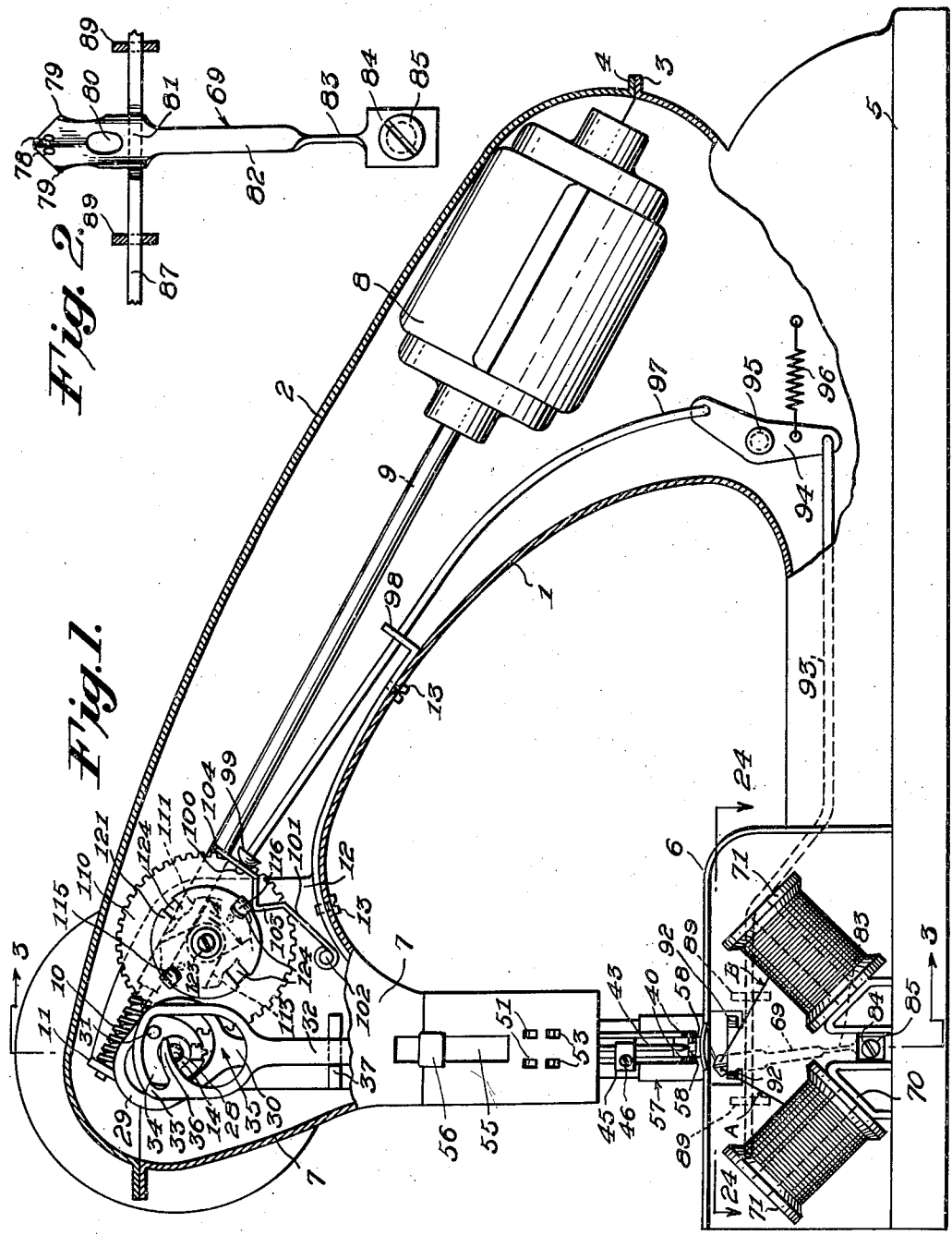

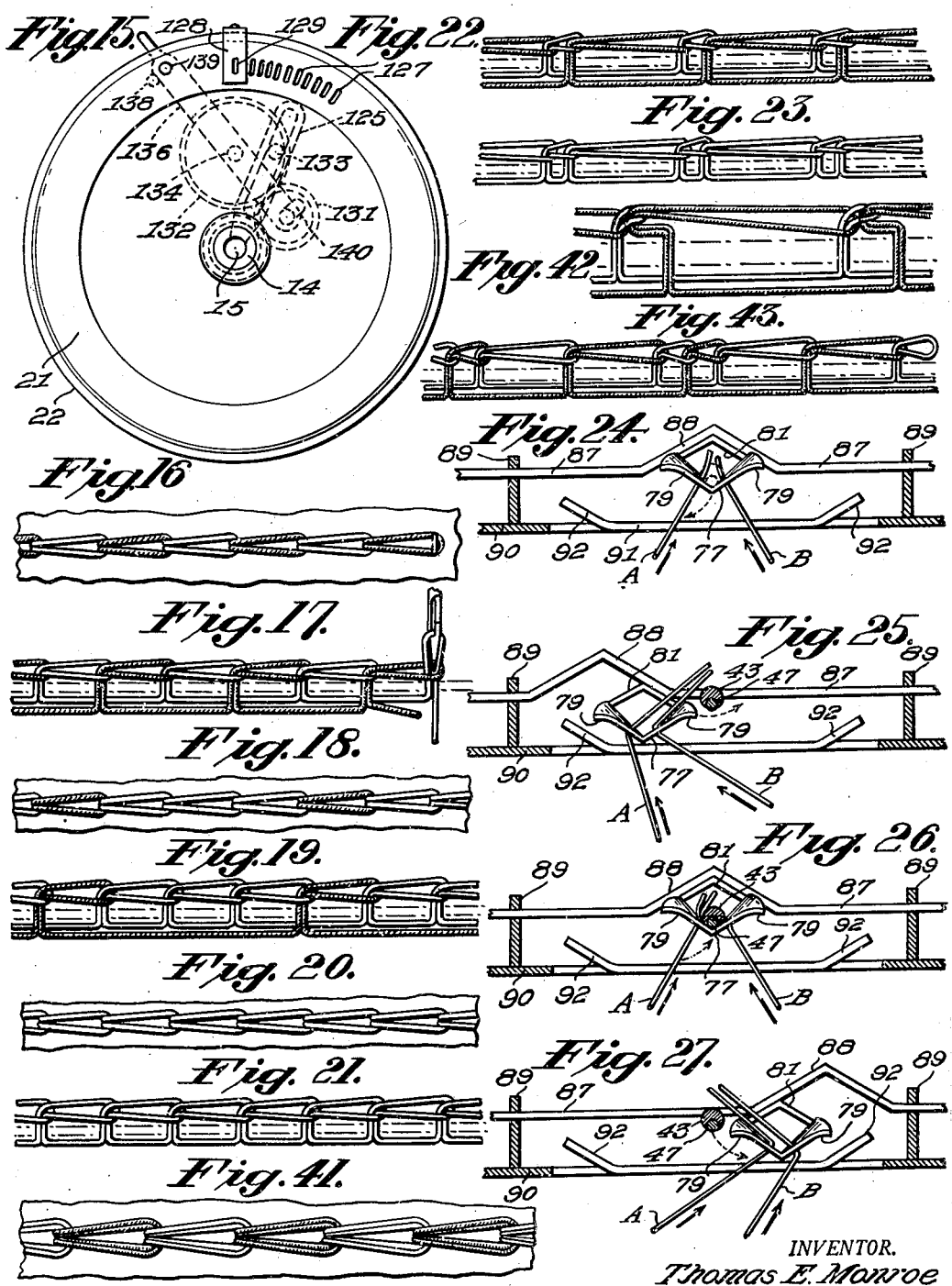

Feb. 14, 1950 T. E. MONROE 2,497,230
STITCH AND METHOD OF STITCHING
Filed Feb. 2, 1943 6 Sheets-Sheet 5
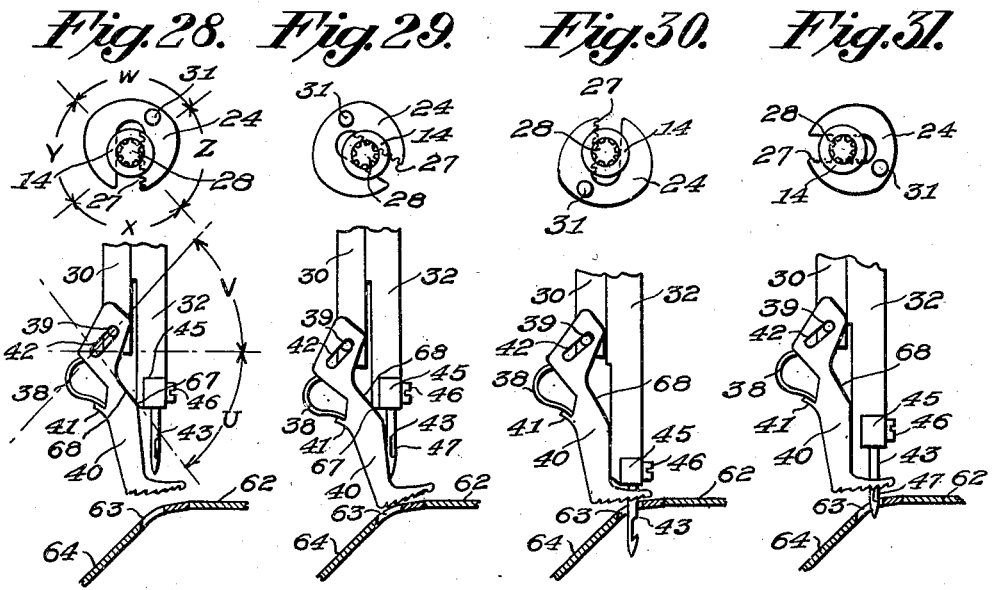
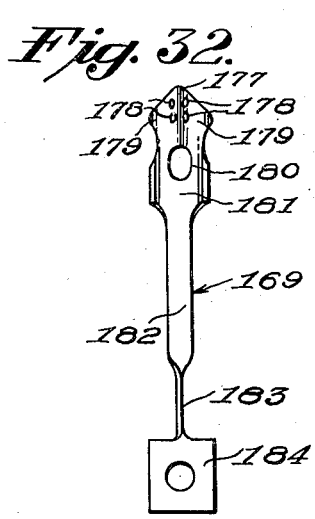
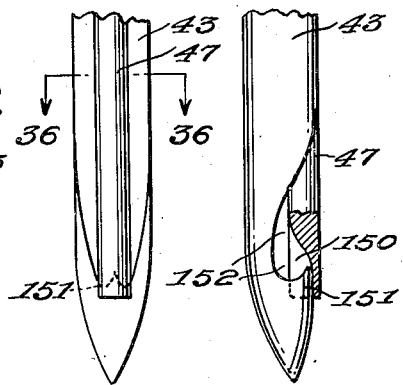
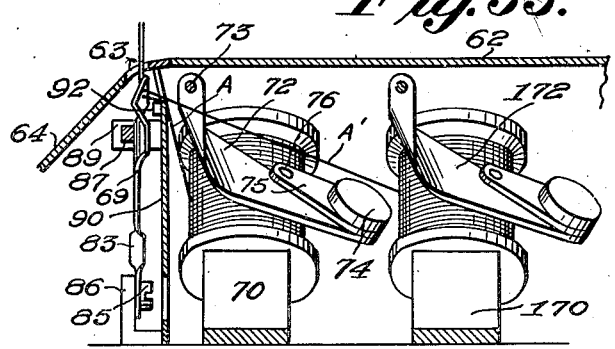
INVENTOR.
Thomas E. Monroe
BY
Sheridan, Davis & Cargill
ATTORNEYS.

Feb. 14, 1950 T. E. MONROE 2,497,230
STITCH AND METHOD OF STITCHING
Filed Feb. 2, 1943 6 Sheets-Sheet 6

INVENTOR.
Thomas E. Monroe
BY
Sheridan, Davis & Cargill
ATTORNEYS

Patented Feb. 14, 1950

2,497,230

UNITED STATES PATENT OFFICE 2,497,230

STITCH AND METHOD OF STITCHING

Thomas E. Monroe, New York, N. Y., assignor of one-half to William R. Donaldson, Northport, N. Y., and one-fourth to William R. Donaldson, as trustee; William R. Donaldson administrator of said Thomas E. Monroe, deceased Application February 2, 1943, Serial No. 474,450

14 Claims. (Cl. 112—262)

This invention relates to stitches and stitching methods.

It is an object of the invention to provide a locked chain stitch structure.

It is a further object of the invention to provide a new stitch having improved mechanical characteristics and providing for enhanced decorative effects.

A still further object of the invention is to provide an improved method of making the improved stitches whereby additional steps or operations and complicated apparatus are rendered unnecessary.

In certain aspects, as will appear more specifically in the following description, the present invention constitutes an improvement upon the disclosures of my previous patents and applications, No. 2,152,203 issued March 28, 1939; No. 2,206,484 issued July 2, 1940; Serial No. 559,579 and Serial No. 559,580, both filed October 20, 1944.

The claims of the present application are directed to the improved stitch structure and stitching method, the improved machine disclosed herein forming the subject matter of a simultaneously filed copending application Serial No. 474,451 filed Feb. 2, 1943, now Patent Number 2,426,636. The machine shown herein is by way of illustration, and is described herein only sufficiently to show one way in which the methods of the invention may be carried out, and the novel stitches produced.

With the above general objects, as well as other objects which will appear in the following description, in mind the invention consists in the novel stitch structures and methods of stitching which will now first be fully described in connection with the accompanying drawing and then pointed out more particularly in the appended claims.

In the drawing:

Figure 1 is an elevation view of a sewing machine adapted for use in practicing the invention, and is taken looking forwardly or in the direction of fabric advance, certain casing parts having been broken away to show internal mechanism;

Figure 2 is an enlarged view of a thread feeder or looping member of the machine of Figure 1 together with certain associated operating mechanism therefor;

Figure 3 is a vertical cross section taken on the line 3—3 of Figure 1;

Figure 3A is a detail plan view of the needle hole;

Figure 4 is a plan view of the control mechanism shown in Figure 3;

Figure 5 is an enlarged cross section taken on the line 5—5 of Figure 4 and showing certain adjustable cam mechanism for controlling the operation of the thread feeding mechanism;

Figure 6 is an enlarged cross section taken on the line 6—6 of Figure 4 and showing the drive mechanism for the needle-bar and feed-foot bar of the machine;

Figures 7 and 8 are detail cross section views of a hollow shaft shown in Figure 6, and show the shaft cut out to accommodate certain regulating mechanism by means of which stitch length is controlled;

Figure 9 is a section taken on the line 9—9 of Figure 3 and showing the regulating mechanism for varying the stitch length;

Figure 10 is a view on an enlarged scale of a portion of Figure 1, and with parts removed so as to show more clearly a portion of the drive mechanism thereof for operating the needle-bar and feed-foot bar and for controlling the thread feeding mechanism;

Figure 11 is a view similar to Figure 10 but with parts removed so as to show the main worm drive and one way clutch of the machine;

Figure 12 is a view in exploded perspective of the parts of Figure 10 which comprise the adjustable cam for controlling the thread feeding mechanism;

Figures 13 and 14 are views illustrating two different conditions of adjustment of the adjustable cam;

Figure 15 is a view looking in the direction of the line 15—15 of Figure 3 and showing further the mechanism for regulating stitch length and for producing varying length stitches;

Figures 16 and 17 are respectively plan and section views showing schematically a double chain stitch such as may be produced from two threads by the machine of Figure 1;

Figures 18 and 19 are similar views showing an alternative stitch producible by the machine and in which three successive loops are taken from one thread for every loop taken from the other;

Figures 20 and 21 are views showing a single chain stitch which may also be produced by the machine;

Figure 22 is a section view similar to Figure 17 but showing a double chain stitch with varying length loops;

Figure 23 is a view similar to Figure 21 but showing a single chain stitch with varying length loops;

Figure 37:
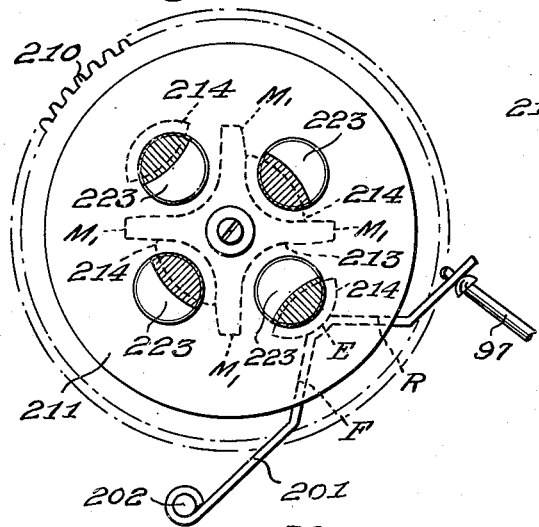
Figure 38:
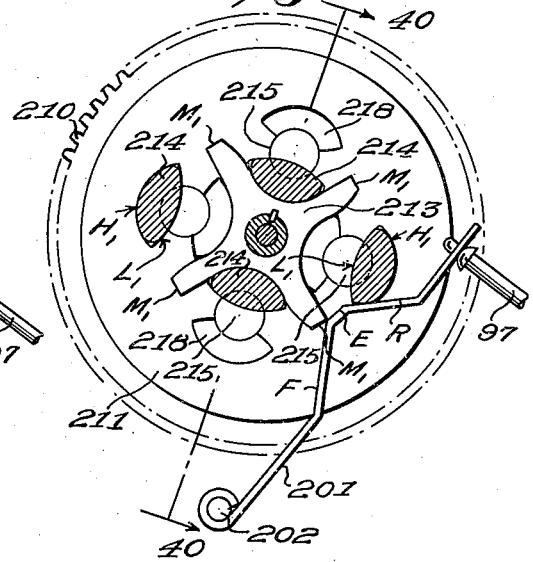
Figure 40:
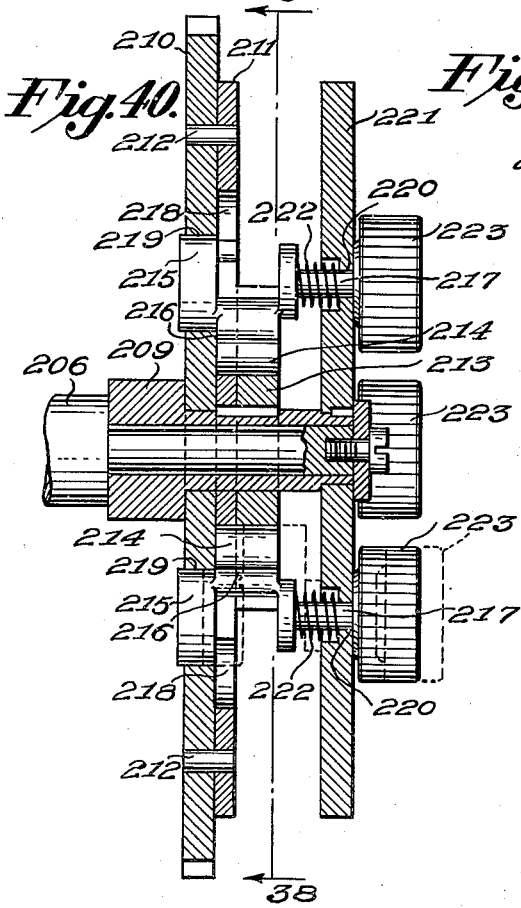
Figure 39:
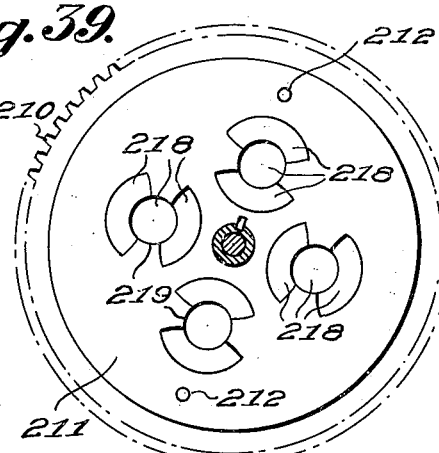

Figures 24 to 27, inclusive, are schematic views on an enlarged scale taken on the line 24—24 of Figure 1 and showing different positions of the thread feeding and looping mechanism;

Figures 28 to 31, inclusive, are schematic views showing the cam and pin drive mechanism for the needle-bar and feed-foot together with the lower portions of the needle-bar and feed-foot and showing the motions of these parts corresponding to the movements of the cam;

Figure 32 is a view similar to Figure 2 but showing a modified form of looping member adapted to handle a plurality of threads in each loop;

Figure 33 is a view similar to Figure 3 but showing only the lower part of the machine and showing a modification thereof for handling pluralities of threads in each loop and which is used with the modified looping member of Fig. 32;

Figure 34 is an enlarged front elevation of the lower end of the needle of Figure 1;

Figure 35 is a side elevation of the lower end of this needle;

Figure 36 is a cross section of the needle of Figure 34 taken on the line 36—36 of Figure 34;

Figure 37 is an enlarged view of a modified stitch control mechanism which may be substituted for that of Figure 10;

Figure 38 is a view of the mechanism of Figure 37 with a cover plate removed and is a section taken on the line 38—38 of Figure 40;

Figure 39 is a view similar to Figure 38 but with further parts removed;

Figure 40 is a section taken on the line 40—40 of Figure 38.

Fig. 41 is a top plan view of a further modified form of stitch such as those shown in Figs. 16 to 21 inclusive, in which modified form the courses and projecting loop portions, each include more than one thread;

Fig. 42 is a sectional view of another form of stitch capable of production by the method and machine herein shown and described, in which the loop of one thread is drawn substantially into the fabric and into locking engagement with the threads of adjacent loops at such points; and Fig. 43 is a view similar to Fig. 22 showing another sequence with double chain stitches of varying length loops.

Referring to the drawing, Figures 1 and 3 are general views of a machine suitable for use in practicing the methods of the invention and producing the stitches of the invention. The operating parts are enclosed within a housing formed of lower and upper casing sections 1 and 2, respectively, which are joined together as by flanges 3 and 4 and mounted on the base 5. A lower housing 6 for the thread handling mechanism is provided and also an upper housing 7 for the needle operating and fabric feeding mechanism.

An electric motor 8 through a shaft 9 and worm 10 serves to drive the machine by means of worm wheel 16 and main drive shaft 14. The shaft 9 is carried in a bracket 11 formed on a frame member 12 fastened to the casing by screws 13. This member may also carry the majority of the operating mechanism so as to facilitate removal and replacement thereof as a unit.

The main drive shaft 14 is hollow and is provided with an inner shaft 15 serving purposes which are later pointed out. The main drive shaft is driven through a one way clutch (Figures 6 and 11) comprising clutch balls or rollers 19 fitting in peripheral notches in a member 18 within the rim of the worm wheel 16 and held together therewith by face plates 17.

The shaft 14 rotates in a bearing 20. At one side of the bearing 20, the shaft 14 is provided with a slot 14' and carries at its outer end a fly wheel 21 which in turn carries a hollow housing 22 for certain stitch regulating mechanism. The inner end of the shaft 14 carries a pinion 23 for driving the thread handling mechanism and also a cam 24 for driving the fabric feeding foot. Cam 24 is bifurcated or slotted and passes through opposed slots 25, 26 in the hollow shaft 14 (Figure 8) being adjustable transversely of the shaft by means of rack teeth 27 cooperating with a pinion 28 which is formed on the end of the inner shaft member 15. In this way, the feed-foot mechanism may be regulated by turning shaft 15 relative to shaft 14 so as to vary the throw of the cam 24.

The cam 24 through a follower 29 drives the feed-foot operating bar 30 and a pin 31 mounted on the cam 24 serves to drive the needle-bar 32, engaging in a mutilated yoke 33 formed in the upper end thereof (Figure 1). This yoke comprises a substantially concentric dwell portion 34 and an idling opening 35 separated therefrom by the dividing wall 36. By means of this construction the needle-bar may be raised manually, when desired, for purposes of adjustment, but is normally driven by the pin 31.

The feed-foot bar 30 and needle-bar 32 reciprocate up and down, being slidably carried in bracket members 37 of the frame 12, and their lower ends pass out of the housing through an opening therein.

The lower end of the feed-foot bar 30 is provided with a spring 38 and a pair of pins 39 which carry the feed-foot 40, the spring 38 engaging the same at 41 and the pins 39 passing through slots 42 in the feed-foot member. As will be understood, only one side of the feed-foot is shown in Figure 3 but the other side, which is not shown, is provided with a similar slot 42 cooperating with a similar pin 39 on the feed-foot bar. The feed-foot is operated by the combined action of the feed-foot bar and the needle-bar, as later described.

The needle-bar carries a hooked needle 43 in a slot 44 at its lower end, the needle being fastened therein by retaining member 45 and set screw 46. A needle pin 47 is slidably mounted in a groove in the needle and terminates in an operating T-head 48 which is received in a cutout 49 in the needle-bar and urged outwardly therefrom by strap springs 50. The casing of housing 7 is formed with an abutment 51, a recess 52 and a lower abutment 53 which cooperate with the T-head to impart the proper movements to the needle pin 47. Manual raising of the needle-bar is provided for by an opening 55 in the casing 7 and a handle 56 upon the needle-bar.

The fabric-foot 57 comprises a pair of tongues 58 on either side of the needle and feed-foot, the ends of which are curved upwardly as indicated in Figure 3 and the fabric-foot is slidably mounted on a member 59 which is attached to the casing 7 as by screws 60 and is pressed downwardly along this member by a spring 61.

The needle, fabric-foot and feed-foot cooperate with a fabric table 62 having a needle hole 63 as indicated in Figure 3A and a slanted portion 64 along which the fabric is discharged. The needle hole 63 may be formed in a keyhole shape, having a substantially circular portion 65 for receiving the needle and a side opening 66 for holding the threads after movement of the fabric.

In operation, the feed-foot bar 30 will first descend as indicated in Figure 29 and the slanted surface 68 thereof will slide along a corner 67 of the needle-bar. This movement brings the feed-foot further under the needle-bar. The feed-foot is stopped by the fabric and is then moved in the fabric feeding direction (to the left, in Figure 3) by a combination of two actions. The first action is that of the pins 39 operating in the slots 42 and pivoting the feed-foot around the corner 67. The second action is that of the needle-bar when it descends and wedges the feed-foot aside. The relative proportions of these two actions will vary with the thickness of the fabric but in either event the proper feeding movement will be imparted to the feed-foot 40 and will be maintained substantially constant regardless of fabric thickness. The proper feed-foot action is most readily obtained when the inclination of the slots 42 and slant 68 are equal and opposite (angles U and V in Figure 28). The needle passes through the needle hole into position to pick up a thread as indicated in Figure 30 and the eye is opened by the needle-pin which withheld, first above the abutment 51 so as to open the eye of the needle, and then in the recess 52 so that the needle-pin passes just below the fabric. Here, shortly before the time when the needle-bar commences its upward movement, the feed-foot starts to rise and then both needle-bar and feed-foot rise together as indicated in Figure 31. As the hook of the needle comes up to the end of the needle-pin the lower wall of the cutout 49 engages the T-head 48 and raises the needle-pin 47 together with the needle so as to draw a loop of thread upwardly in the closed eye of the needle.

A looping member 69 supplies thread to the needle from spools 71 carried on supports 70 within the lower housing 6 and the tension of the threads A and B from the respective spools 71 is regulated by tension arms 72 pivotally mounted in the housing 6 at 73 and provided with tension adjusting weights 74 which are carried on arms 75 mounted pivotally in turn at 76 on the arms 72. As will be apparent, by turning an arm 75 the distance of the weight 74 from the pivot point 73 may be varied so as to change the tension upon the threads.

The looping member 69 (Figures 1 to 3 and 24 to 27) comprises an upper portion of angular shape formed with a needle engaging surface 77 and with thread guides 78 at opposite sides of this surface. Proper engagement with the needle is assured by wing portions 79 at opposite sides of the thread guides which are adapted to engage the needle and guide the looping member into proper relation thereto. Below an aperture 80, the looping member 69 is provided with a reversely facing angle 81 to cooperate with certain operating mechanism and with a flexible shank composed of a relatively long strap spring portion 82, a short strap spring portion 83 which is twisted at right angles, and a lower portion 84 which is fastened by means of a screw 85 to a support bracket 86. The operating member 87 for the looping member 69 carries an angle 88 adapted to receive the angle 81 previously referred to and is slidably carried in brackets 89 of a support plate 90 which latter provides also a bearing surface 91 and end stops 92 for guiding and limiting the movement of the member 69. The mechanism is arranged so that member 87 will be in the position of Figure 25 or Figure 27 when the needle-bar and feed-foot are at the top of their strokes and so that it is returned to the position of Figure 24 when the needle has come down into position to receive the thread. The thread is wiped or pressed into the hook of the needle by the portion 77 as the needle rises and due to the construction of the member 69 only the nearer thread will be picked up. In this way threads A and B may be picked up selectively in any desired order by controlling the reciprocatory movements of the member 87.

The member 87 is reciprocated by means of a rod 93 connected to one end of bell crank 94 which is carried on pivot 95. The bell crank is urged in one direction by a spring 96 and forced in the other by cam rod 97 slidably mounted in a bracket 98 and which terminates in a button 99 and pin 100 which engage a cam follower member 101. The cam follower member is mounted on a pivot at 102 and includes an engaging portion 103 in cooperating relation with a suitable cam and an end portion 104 which engages the button 99 and has an opening to receive the pin 100. The cam mechanism for driving the follower 101 is best shown in Figures 4, 5, 10 and 12 to 14 and comprises a stationary stub shaft 105 which is mounted on the frame 12 and fastened thereto by a collar 107 and which carries on a reduced portion 108 a rotary cam shaft 109. A gear wheel 110 and a cam member 111 fixed thereto as by means of pins 112 are keyed to the shaft 109 and adjustable cam members 113 and 114 are rotatably mounted on the shaft 109. Each of the members 113 and 114 may be angularly adjusted by means of an arm 115 or 116 engaging by means of a pin 117 or 118 in an opening 119 or 120. The arms 115 and 116 may be set in various angular positions in relation to a disk or face plate 121 which is keyed to shaft 109 and held thereon by means of a washer 122 and screw 123. Peripheral indentations 124 may be formed in the disk 121 for determining the positions of the arms 115 and 116.

The cam member 111 as indicated in Figure 12 comprises a succession of levels; e. g., a middle level M, a high level H, another middle level M, and a low level L corresponding respectively to the looping member positions of Figure 24, Figure 25, Figure 26 and Figure 27. Passage from a high level to a middle level and then to either a high or a low level will engage thread A with the needle. Conversely, passage from a low level to a middle level and then to either a high or a low level will engage thread B with the needle. In this way, the successive loops of a stitch may be taken selectively from the two threads according to the contour of the cam.

Inasmuch as the cam has a total of four high and low levels, it is properly related to the needle-bar drive mechanism by rotating at one-quarter the speed of the drive shaft 14, so that the gear ratio between drive pinion 23 and wheel 110 is made 1 to 4.

Varying sequences of stitches are provided for by means of the members 113 and 114, each of which has a single high level. These may be brought into registry with the high levels of the member 111 as in Figure 10, in which case a stitch formed of a repetition of the stitch sequence ABAB will be produced. By setting one of the members 113 or 114 at right angles as shown in Figure 13, the effective contour of the cam is altered so that it has three high levels and one low level, and a stitch composed of the reiterated sequence AAAB will be produced. By setting both members 113 and 114 at right angles as indicated in Figure 14 a single chain stitch consisting of the reiterated sequence AAAA will be produced.

The invention contemplates the production of a stitch in which the successive loops are of different lengths and illustrative mechanism which may be employed for this purpose is shown in Figures 3, 6 and 9. As there shown a slotted arm 125 keyed at 126 to the inner drive shaft member 15, previously referred to, and may be employed for adjusting this shaft angularly with relation to the outer drive shaft 14. Such adjustment will, through the rack 27 and pinion 28, adjust the throw of the cam 24 and pin 31 thus varying the length of movement of the needle-bar and feed-foot bar. The relationship of the arm 125 to the housing 22 may be fixed by mechanism later described and, accordingly, turning this housing in relation to the fly wheel 21 will produce the required adjustment. In view of this, the fly wheel is provided with indentations 127 (Figure 15) adapted to receive a projection 129 of an angle 128 which is fastened to the housing 22 and by means of which the housing 22 may be set in various angular positions so as to adjust the length of stitch.

Variation from the length of stitch which would otherwise be produced is provided for by a planetary gear train including a fixed gear 130 and driven gears 131 and 132, the latter of which carries a pin 133 operating in the slot of the arm 125 for rocking the same back and forth. The gear 132 is carried by housing 22 on a shaft 134 while the gear 131 is carried on its shaft 135 by an arm 136 which is swingable about the shaft 134 so as to put the gear 131 into mesh or out of mesh with the fixed gear 130. The arm 136 is provided with a projection 137 adapted to enter into recesses 138 or 139 for the purpose of fixing it in meshed or unmeshed position and the necessary displacement of shaft 135 is accommodated by the slot 140 in the member 22. As will be noted, when the gear 131 is out of mesh it engages a pin 141 which serves through the gears 131 and 132 to hold the pin 133 in fixed position. When, however, the gear 131 is in mesh with fixed gear 130, rotation of the housing 22 will cause it to roll around the fixed gear 130 and in turn impart a rotary movement to the gear 132. The gear ratios are selected so that a complete rotation of the housing (starting, say in the position of Figure 9) will produce only a half rotation of the gear 132 so that the arm 125 will be rocked (to the left, in Figure 9). The next rotation of the housing 22 will complete the full rotation of gear 132 and restore pin 133 to its original position. In this way, alternately long and short strokes of the needle-bar and needle-pin and feed-foot bar will be produced and corresponding long and short stitches.

Figures 16 and 17 illustrate merely a double chain stitch such as is known and which may be produced with the machine just described. This stitch forms no part of the present invention but in illustration thereof will be found convenient for purposes of comparison.

Figures 18 and 19 illustrate a multiple chain stitch; Figures 20 and 21 a single chain stitch. These stitches again form no part of the present invention but will serve to illustrate features thereof in a comparative way.

Figure 22 shows a novel stitch produced in accordance with the present invention and this as will be observed is similar to the known stitch of Figures 16 and 17 in that it is composed of loops taken alternately from two different threads. It is dissimilar, however, in that the successive loops are of alternately different lengths.

Figure 23 illustrates a single chain stitch having alternate short and long loops.

The improved stitch sequences of the present invention are conveniently indicated by designating loops from the respective two threads as A and B where the loops are long and as $a$ and $b$ where they are short. For example, the stitch of Figure 23 may be represented as having the sequence $aAaA$, etc., and will be seen to be composed of a repetition of the two stitch sequence $a, A$. The stitch of Figure 22 may be represented by the sequence $aBaB$, etc., and will be seen to be composed of a repetition of the two stitch sequence $a, B$. Where the stitch length variation of Figure 22 or 23 is employed with the loop sequence of Figures 19 and 20, there may be obtained a sequence such as $aBbBaBbB$, etc., which is composed of a repetition of the four stitch sequence $aBbB$. The sequence may also be $AbBbAbBb$, etc., which consists of a repetition of the four stitch sequence $AbBb$. This last sequence, as will be observed, has long loops from both threads and short loops from only one while the sequence just mentioned has short loops from each thread but long loops from only one.

As will be apparent, the invention contemplates the production of stitches in which the successive stitches form a sequence of stitches of different lengths, and which is made up of a repetition of a smaller or unit sequence, and in which the stitches also form a sequence of stitches taken from different threads, which is also made up of a repeated unit sequence. By employing different sequences in combination a large number of stitches having desirable locking characteristics combined with very pleasing decorative effects may be produced.

Other sequences than those performed by the specific mechanism illustrated may be employed. For example, two stitches may be taken from one thread followed by two stitches from the other thread and this sequence may be combined with the length sequence of Figure 23 in different ways. For example, a stitch sequence $aBbB$, etc., may be produced or the reverse sequence $BbAa$, etc., may be produced.

As will be apparent the different threads employed may be of the same color or of different colors and inter-relation of stitch length variation with color variation may be employed to produce a great variety of decorative effects.

By employing suitable automatic mechanism or by hand control of a machine, different stitch length sequences are readily obtainable. For example, a stitch length sequence composed of a repetition of a three stitch unit sequence having one short loop followed by two long loops, may be employed. This may be combined in various ways with the thread sequences shown or with other thread sequences and particularly desirable effects may be achieved when the numbers of the threads in the unit thread sequence and in the unit loop-length sequence are different. For example, a three loop-length sequence consisting of one short loop followed by two long loops may be combined with the thread sequence of Figures 18 and 19 to produce the combined unit sequence $aBBbAbbBabBB$. It will be noted that in this case the stitch formation produced consists of a repetition of a unit of twelve loops and that the stitch formation cannot be described as a repetition of any lesser number of loops. As a general proposition, when a given thread sequence is combined with a given loop-length sequence, the combined sequence will be composed of a repetition of a unit sequence having a number of loops equal to the least common multiple of the number of loops in the unit thread sequence and the unit loop-length sequence. By varying the relationship between the two sequences a variety of such combined sequences can be produced. For example, the thread sequences and loop-length sequences now just referred to can be combined to produce also the following sequences bBBaBBbABbBa and bBAbBBaBBbAB.

The stitch of the invention may also be produced by combining different length sequences with thread sequences taken from more than two different threads. No mechanism is illustrated for the purpose of handling more than two different threads as such arrangements are well known in the art. For example, a sequence ABC, etc., composed of the three threads A, B and C may be combined with the loop-length sequence of Figure 23 to produce the sequence aBcAbC, etc. It will be noted this stitch is composed of a repetition of a unit sequence of six stitches, six being the least common multiple of three and two, which are the respective numbers of stitches in the thread sequence and in the loop-length sequence.

The stitch composed of both long and short loops has desirable locking characteristics regardless of the number of threads employed and regardless also of the precise sequences of long and short loops. This locking effect will be understood from Figure 22 or 23 by considering the extreme righthand loop as being a free loop and considering the effect of an attempt to separate the plies of fabric, whether by a sidewise pull on the respective sides of the stitch or by pulling the plies directly apart. The fabric plies can be separated only by pulling the next to the right-hand loop, which is a short loop, back through the fabric. This cannot occur, however, unless the short loop in question is freed from the extreme righthand loop. By making the difference in length between these two loops sufficiently great, the long loop can be made to prevent the short loop from passing back through the fabric. This effect occurs because the short loop, when put under tension, causes the long loop to fall backwards, lying across the fabric and preventing the short loop from passing back through the fabric. In a conventional chain stitch such as shown in Figures 20 and 21, this effect is not present inasmuch as the free loop will, when it falls backward, release the preceding loop, due to the fact that its length is approximately the same, so that it cannot overlie the bight of the preceding loop or point where the preceding loop passes through the fabric.

A further increase in locking effect is possible by modification of the loop characteristics. This modification is not shown because insusceptible of clear illustration but will be readily understood by reference to Figures 22 and 23.

In Figures 22 and 23, the loop-length is substantially equal to the stitch length so that each loop passes around the succeeding loop without pulling the same backward to any substantial extent, and the parts of the successive loops which are above the fabric lie or extend along the same in line with the stitch. It is possible, however, further to increase the locking effect by reducing the short loop to a point where it has substantially no portion which lies on the fabric but consists merely of a loop extending upwardly through the fabric as is indicated in Fig. 42. The tension on the longer loop may also be correspondingly reduced where this is found desirable to maintain the same average tension. In this case, the bend in the succeeding long loop will be pulled back over the previous long loop so that a structure having the appearance of successive long loops with small knots at their meeting points will be produced. This structure may readily be produced by increasing the tension of the thread from which the short loops are taken by comparison with that upon the thread from which the long loops are taken. In this way, a short loop as shown in Figure 22 or 23 will be produced but this short loop will be further shortened when the next short loop is made, by the intervening course under the fabric exerting tension upon it. As will be observed, such a stitch may readily be obtained by combining the method and means of my said applications Serial No. 559,579 and 559,580, according to which varying length loops are produced solely by tension variation, with the means herein set forth and the method disclosed below, in which the different length loops are produced by varying the fabric feed.

A preferred method for producing the stitch of the present invention is to alter the length of the fabric feed as a means of producing the different length loops. It should be noted in this connection that what is contemplated is not merely a variation in the movement of the fabric feed member as this in itself depending upon the character of the different threads being worked upon and also upon the character of the fabric and the thread handling mechanism may in actuality produce loops of different lengths or loops of any substantially different lengths but may merely compensate for or counterbalance other factors which tend to alter the length of loop.

The alteration in the length of fabric feed between the successive stitches must be accompanied by a suitable adjustment of thread tension. This is obtained in the mechanism previously described by varying the length of stroke of the neddle-bar. For example, if it be assumed that a short stitch is to be formed, the needle-bar will rise only a short distance above the fabric, thus pulling up a short loop, and the fabric foot will impart to the fabric a short movement. If, however, a longer stitch is to be made, the needle-bar will raise higher, thus pulling up a longer loop to provide for the greater fabric movement. In this way, the pull of the fabric on the loop may be kept substantially the same even though the fabric feeding movement varies. It should be noted that, apart from some such provision, the pull exerted upon the loop during a long fabric movement would be greater than that exerted during a short fabric movement. This is the reverse of the desired effect, for, if the tensions are to be materially different, it is desirable that the tension on the short loop be greater than on the long one. It will also be noted that, in the machine illustrated, the latter part of the feed-foot movement is produced by the needle-bar as it commences to move down, with the result that the loop is brought closer to the fabric during the last part of the fabric movement and this also tends to reduce and to equalize loop tension when forming the loops of different lengths.

Tension adjustment or compensation may, however, as will be apparent to those skilled in the art, be obtained in various other ways than that shown. For example, machines equipped with a tension release which operates while the fabric is being fed will not require the varying stroke of the needle-bar. Such tension release will naturally be employed where the loop is held by a member other than the needle, as is the case in known machines in which a chain stitch is made by a needle having an eye instead of by means of a hooked needle. Alternatively or in addition, tension takeups of known type which adjust the loops after their formation may be utilized.

Various subsidiary features and modifications of the mechanism described above are shown in Figures 32 to 40, inclusive, for completeness of illustration. These need be considered in detail only in so far as they relate to the stitches and method of stitching.

Figures 34 to 36 show an improved form of needle which is suitable for use in practicing a method of the invention. As there shown, the needle-pin 47 has a groove or channel 150 at its lower end which receives and covers the hook 151 of the needle, forming an opening 152 for receiving and holding the thread.

In Figures 32 and 33 there is illustrated an arrangement by means of which a novel stitch may be produced. As there shown, a modified looping member 169 which is adapted to handle sets of threads instead of a single thread for each loop may be substituted for the looping member of Figure 2. Corresponding parts are identified by corresponding numerals increased by 100 and this structure requires no further description other than to point out that two thread guides 178 are provided at each side instead of a single thread guide 78 at each side, so that the needle may pick up two threads at each stroke.

As indicated in Figure 33 additional spools and tensioning equipment may be provided. A thread A from one spool may pass through a lower thread guide 178 and a thread A₁ from a second spool may pass through an upper thread guide 178. The thread guides on the other side of the looping member carry corresponding threads B and B₁, not shown.

When the machine with these modifications is operated, the action will be the same as described above except that each loop will be composed of two threads. Due to the thread guiding arrangements provided, the needle will pick up the threads in the same order for each loop so that the threads will be arranged transversely of the stitch in a definite order and not at random. Similarly, the courses of the threads below the fabric will be arranged in a definite order. In this way a novel chain stitch having desirable mechanical characteristics and capable of producing very pleasing decorative effects is obtained. The stitch may be composed of successive loops all of which are formed from the same set of threads, or the successive loops may be formed from different sets of threads and the lengths of the successive loops may also be varied as in the case where each loop is formed from a single thread. The showing of two sets of two thread guides is purely illustrative, it being apparent that the thread structure produced may be composed of more than two sets of threads or of sets of threads each of which contains more than two threads.

Figures 37 to 40, inclusive, illustrate a modified cam arrangement providing a greater range of adjustment than can be had with the cam 111 previously referred to. Parts 201 to 210, inclusive, are provided and are sufficiently similar to the corresponding parts 101 to 110 of Figure 10 to require no further description.

The gear wheel 210 is fastened together with a disk 211 as by means of pins 212 and these parts are keyed to the shaft 209. Suitable apertures 218 and 219 are provided in the disc 211 and gear wheel 210, respectively, to receive a member 213 having middle level bearing surfaces M₁ and a member 214 having both high and low bearing surfaces H₁ and L₁. The member 214 comprises shaft portions 215 in the apertures 219, operating portions 216, and further shaft portions 217. The openings in the plate 211 and gear 210 are provided to permit setting members 214 in either high or low position and the assembly is completed by a disk or face plate 221 having openings 220 for receiving the shafts 217 which are urged into the position of Figure 40 as by springs 222 and adjustment to the various members 214 is provided for by means of knobs 223.

This completes the assembly which is of interest for present purposes only as illustrating additional thread sequences over those provided by the cam of Figure 10. Inasmuch as the cam may be adjusted to have either four high levels or four low levels or to have a high or low level in any of the four positions, it provides for making the same sequences of stitches from either thread and also provides for the stitch sequence AABB referred to above. As will be apparent, however, the method of the invention may be carried out with arrangements of any desired construction for presenting various threads to the needle in various orders.

What is claimed is:

1. In a stitched structure the combination with a plurality of superposed plies of fabric, of a plurality of loops of thread extending through said plies of fabric at a succession of points spaced apart along the fabric at relatively short and longer distances, each said loop intermediate the end loops passing through the preceding loop and around the succeeding loop in said plurality of loops, said plurality of loops including short and long loops at said short and longer distances, respectively, arranged in a regularly recurring order, each said short loop having a length substantially equal to the thickness of said superposed plies of fabric and terminating between its and the next succeeding loop's points of passage through the superposed plies of fabric, and each said long loop next succeeding a said short loop extending from its point of passage through the superposed plies of fabric rearwardly along said outer face thereof through the said short loop and then about the thread thereof and forwardly along said outer face of the superposed plies of fabric and around the next succeeding loop in said plurality of loops.

2. In a stitched structure the combination as set forth in claim 1 wherein said plurality of loops are alternately long and short.

3. In a stitched structure the combination as set forth in claim 1, wherein two threads alternate in said plurality of loops.

4. In a stitched structure the combination as set forth in claim 1, wherein said plurality of loops are composed of two threads, the loops of one of said threads being the long loops and those of the other of said threads being the short loops.

5. In a stitched structure the combination as set forth in claim 1 wherein said plurality of loops are composed of two threads, the loops of each of said threads alternating with the loops of the other of said threads, and the loops of one of said threads being the short loops and those of the other of said threads being the long loops.

6. In a stitched structure the combination with a plurality of superposed plies of fabric, of a plurality of loops of two threads, the loops of each thread alternating with the loops of the other thread and extending through said plies of fabric at a succession of points spaced along the fabric, each said loop intermediate the end loops passing through the preceding loop and around the succeeding loop in said plurality of loops, said plurality of loops varying in length and including a repeated predetermined sequence of a short loop from one of said threads followed by a long loop from the other of said threads and a long loop from the first said thread followed by a short loop from the said other thread.

7. In a chain stitched structure the combination with a fabric, of a plurality of threads extending in multi-thread courses along one face of the fabric, extending therethrough at spaced points therealong and arranged in multi-thread loops along the other face of the fabric, the multi-thread courses and loops of the same threads having the threads thereof arranged in the same order transversely of the respective faces of the stitched structure, the combinations of different threads in successive loops varying in a predetermined sequence.

8. In a chain stitched structure the combination with a fabric, of a plurality of threads extending in multi-thread courses along one face of the fabrics and therethrough at spaced points and arranged in multi-thread loops along the other face of the fabric, each multi-thread loop intermediate the end multi-thread loops extending through a preceding multi-thread loop and around a succeeding multi-thread loop, said multi-thread courses and loops respectively including a number of threads variable in a predetermined sequence.

9. A method of stitching in a stitching machine with loop forming, fabric feeding, and thread tensioning means, which comprises passing a loop from a thread on one side of a fabric therethrough to the other side thereof, feeding said fabric while holding said loop to arrange it along the fabric, passing a second loop from the thread through the fabric and the first said loop, feeding said fabric a lesser distance while holding said second loop to arrange it along the fabric, and repeating the foregoing steps while applying sufficient tension to the thread relative to the fabric lead movements as to decrease the length of each of said second loop along the fabric to less than said lesser distance of fabric feed movement.

10. A method of stitching in a stitching machine with loop forming and fabric feeding means, which comprises successively passing loops from a thread on one side of a fabric therethrough and after the first loop through the preceding loop at the other side of said fabric and to a variable distance beyond the other side of said fabric, moving said fabric, after each loop is passed therethrough and while holding said loop a distance corresponding to the length of that loop to dispose it along the fabric, and correspondingly varying said distance beyond the other side of the fabric whereby to vary the length of the loops passed through the fabric and the distance of fabric movements in a predetermined sequence.

11. A method of stitching in a stitching machine with loop forming and fabric feeding means, which comprises selecting threads at one side of a fabric in a predetermined sequence, passing loops from the selected threads in the order of their selection through the fabric and after the first loop through the preceding loop to predetermined variable distances beyond the other side of said fabric whereby to form thread loops of different predetermined lengths and moving said fabric, after each loop is passed therethrough a distance corresponding to the predetermined length of that loop to dispose it along the fabric for passage of a succeeding loop therethrough.

12. A method of stitching in a stitching machine with loop forming and fabric feeding means which comprises selecting threads at one side of a fabric in any of a plurality of predetermined sequences, passing loops from the selected threads in the order of their selection through the fabric and after the first loop through the preceding loop to a predetermined variable distance beyond the other side of said fabric whereby to form thread loops of different predetermined lengths, moving said fabric after each loop is passed therethrough while holding said loop a distance substantially equal to the predetermined length of said loop to dispose it along the fabric, and after the passage of each of a plurality of predetermined loops through the fabric applying sufficient tension to the thread of each such loop relative to the ensuing fabric movement as to decrease the length of that loop along the fabric to less than its predetermined length.

13. A method of stitching in a stitching machine with loop forming and fabric feeding means which comprises successively passing loops from a thread on one side of a fabric therethrough and, after the first loop, through the preceding loop at the other side of said fabric and to a variable distance beyond said other side of said fabric, varying in a predetermined sequence said distance beyond the other side of the fabric whereby to vary in the same sequence the lengths of the loops passed through said fabric, and after each loop is passed through said fabric holding said loop while moving the fabric different distances respectively corresponding to the length of the held loop to dispose same along the fabric.

14. In a chain stitched structure the combination with a fabric, of a plurality of threads extending in courses along one face of the fabric and therethrough at spaced points and arranged in concatenated loops along the other face of the fabric, said courses and loops respectively comprising more than one of said threads.

THOMAS E. MONROE.

REFERENCES CITED

The following references are of record in the file of this patent:

UNITED STATES PATENTS

| Number | Name | Date |
| --- | --- | --- |
| 29,268 | Hicks | July 24, 1860 |
| 151,558 | Blanchard | June 2, 1874 |
| 1,699,423 | Brase | Jan. 15, 1929 |
| 2,042,590 | Chiti | June 2, 1936 |

FOREIGN PATENTS

| Number | Country | Date |
| --- | --- | --- |
| 14,187 | Great Britain | Nov. 16, 1905 |
| 427,803 | France | Aug. 14, 1911 |